(12) United States Patent
Hasegawa

(10) Patent No.: US 8,279,553 B2
(45) Date of Patent: Oct. 2, 2012

(54) ROLLING BEARING, BEARING DEVICE AND INFORMATION RECORDING AND REPRODUCING DEVICE

(75) Inventor: Haruhiko Hasegawa, Chiba (JP)

(73) Assignee: Seiko Instruements Inc. (JP)

( * ) Notice: Subject to any disclaimer, the term of this patent is extended or adjusted under 35 U.S.C. 154(b) by 0 days.

(21) Appl. No.: 13/134,499

(22) Filed: Jun. 9, 2011

(65) Prior Publication Data

US 2011/0304938 A1 Dec. 15, 2011

(30) Foreign Application Priority Data

Jun. 10, 2010 (JP) .................................. 2010-133264

(51) Int. Cl.
*G11B 5/127* (2006.01)

(52) U.S. Cl. .................................................. 360/99.08

(58) Field of Classification Search .............. 360/265.2, 360/265.6, 99.08, 266, 265.3, 264.3, 264.4, 360/265.5, 264.7

See application file for complete search history.

(56) References Cited

U.S. PATENT DOCUMENTS

| | | | | |
|---|---|---|---|---|
| 5,465,186 | A * | 11/1995 | Bajorek et al. | 360/323 |
| 6,351,352 | B1 * | 2/2002 | Khan et al. | 360/264.2 |
| 6,490,137 | B1 * | 12/2002 | Toyota et al. | 360/265.2 |
| 6,970,329 | B1 * | 11/2005 | Oveyssi et al. | 360/264.8 |
| 8,015,692 | B1 * | 9/2011 | Zhang et al. | 29/603.14 |
| 8,018,688 | B2 * | 9/2011 | Kamigama et al. | 360/266 |
| 2004/0136116 | A1 * | 7/2004 | Koyama | 360/265.2 |

FOREIGN PATENT DOCUMENTS

JP 2002089574 3/2002

* cited by examiner

*Primary Examiner* — Allen Cao
(74) *Attorney, Agent, or Firm* — Adams & Wilks

(57) ABSTRACT

A rolling bearing provided with a shield plate which hardly induces the irregular deformation of an outer ring without increasing a cost is provided. A rolling bearing includes an inner ring and an outer ring; a plurality of rolling bodies which are held between the inner ring and the outer ring in a rotatable manner; and an annular shield plate which is engageable with an engaging groove portion which is formed on an inner peripheral surface of the outer ring along the circumferential direction and opens toward an inner peripheral surface side and an open end side. The shield plate includes: an annular shield body; and a plurality of engaging projections which are arranged along the outer peripheral portion of the shield body, project outwardly in the radial direction from the outer peripheral portion in an inclined state, and are engageable with the engaging groove portion. The engaging projection is deformable by bending in the orthogonal direction orthogonal to the in-plane direction of the shield body using a connecting portion of the engaging projection connected with the outer peripheral portion of the shield body as a start point, and is formed such that a projecting length of the engaging projection from the outer peripheral portion at both end portions in the circumferential direction is set shorter than the projecting length of the engaging projection from the outer peripheral portion at a center portion in the circumferential direction.

10 Claims, 13 Drawing Sheets

ROLLING BEARING, BEARING DEVICE AND INFORMATION RECORDING AND REPRODUCING DEVICE

BACKGROUND OF THE INVENTION

1. Field of the Invention

The present invention relates to a rolling bearing provided with a shield plate, and a bearing device and an information recording and reproducing device which include the rolling bearing.

2. Background Art

Conventionally, there has been known an information recording and reproducing device such as a hard disc which magnetically or optically records various kinds of information therein and reproduces various kinds of information therefrom. In general, this type of information recording and reproducing device includes an actuator provided with a swing arm where a head portion which records a signal in a disc and reproduces a signal from the disc is mounted on a distal end of the swing arm. The actuator is rotatably supported on a bearing device mounted on a proximal end of the swing arm. That is, it is possible to rotate the swing arm along a horizontal plane by rotating the bearing device so that the head portion mounted on the distal end of the swing arm can be moved to a predetermined position of the disc whereby recording and reproduction of a signal can be realized.

The bearing device which rotates the swing arm is constituted of a shaft, a sleeve and a rolling bearing interposed between the shaft and the sleeve in general. Particularly, a rolling bearing which is used as this type of bearing device is required to be operated in a stable manner for a long period and hence, conventionally, it is often the case that a roller bearing provided with a shied plate is used.

This rolling bearing provided with a shield plate is a rolling bearing in which an annular shield plate (hermetically sealing plate) is mounted on an inner peripheral surface of an outer ring, and a circular annular space defined between a shaft and a sleeve is closed by a shield plate.

Accordingly, it is considered that the shield plate can prevent the adhesion of dusts or the like from the outside to rolling bodies, trajectory surfaces of the outer ring and the inner ring and the like, and can suppress leakage of grease, lubrication oil and the like in the inside of the roller bearing to the outside. Accordingly, the rolling bearing provided with a shield plate can be operated easily in a stable manner for a long period compared with a rolling bearing which is not provided with a shield plate.

As such a rolling bearing provided with a shield plate, for example, there has been known a rolling bearing which uses a shield plate provided with a plurality of engaging projections on an outer peripheral portion thereof (see JP-A-2002-89574).

In the shield plate adopted by the rolling bearing, a metal plate is formed into an annular shape, and the plurality of engaging projections are formed in a projecting manner on the outer peripheral portion of the metal plate along the circumferential direction at predetermined intervals. The plurality of these engaging projections are formed in a projecting manner such that the engaging projections are inclined obliquely toward the outside in the radial direction from the outer peripheral portion, and are deformable by bending in the orthogonal direction approximately orthogonal to the in-plane direction of the shield plate.

The shield plate having such a constitution is mounted on the outer ring by engaging the engaging projections with the inside of an engaging recessed groove formed on the outer ring.

To be more specific, the shield plate is pushed into the inside of a circular annular space defined between the outer ring and the inner ring such that the engaging projections are fitted into the inside of the engaging recessed groove. Due to such pushing, the engaging projections are fitted into the inside of the engaging recessed groove while being bent in the above-mentioned orthogonal direction using a proximal side as a start point. Then, when the shield plate is completely pushed into the inside of the circular annular space, the engaging projections elastically return in the inside of the engaging recessed groove due to an elastic restoring force so that the engaging projections push an inner surface of the engaging recessed groove. Accordingly, the engaging projections are caught by and are brought into an engagement state with the engaging recessed groove. In this manner, the shield plate is mounted on the outer ring.

SUMMARY OF THE INVENTION

In the conventional shield plate, the engaging projection is deformed by bending in the orthogonal direction approximately orthogonal to the in-plane direction of the shield plate using the portion of the engaging projection connected to the outer peripheral portion of the shield plate as the start point. In such structure, the engaging projection is deformed by bending along the outer peripheral portion and hence, the engaging projection is not bent smoothly whereby stress is liable to be stored in the engaging projection. Further, as shown in FIG. 12 and FIG. 13, when a shield plate 100 is pushed into an engaging recessed groove 110, both end portions 101a of an engaging projection 101 in the circumferential direction are liable to be locally brought into contact with an inner side surface 111 of the engaging recessed groove 110.

Accordingly, in addition to the above-mentioned stress, an internal stress is concentrated on a center portion 101b of the engaging projection 101 in the circumferential direction thus giving rise to a possibility that the center portion 101b is excessively irregularly deformed. As a result, the engaging projection 100 is liable to strongly push the inner side surface 111 of the engaging recessed groove 110 toward the outside of an outer ring 112 in the radial direction.

Accordingly, in the conventional rolling bearing provided with a shield plate, there exists a high possibility that the outer ring is irregularly deformed due to a pushing force of the engaging projection such that the outer ring bulges toward the outside in the radial direction and hence, the circularity of the outer ring is deteriorated thus giving rise to a possibility that harmful oscillations and a change of load torque occur.

Further, due to a strong pushing force of the engaging projection, there also exists a possibility that a center portion of the shield plate is distorted by buckling and hence, the appearance of the rolling bearing is deteriorated or the shield plate is brought into contact with a part which makes the relative movement with respect to the outer ring, for example, a retainer or the like.

Assuming a case where a lateral length (a lateral length W shown in FIG. 13) of the engaging projection along the circumferential direction is made small to decrease a pushing force of the engaging projection, for example, the engaging projection is deformed during transportation or the like so that a catching function of the engaging projection is liable to be lowered thus increasing a possibility that the shield plate is removed from the outer ring. Further, working of the engaging projection becomes more difficult thus giving rise to a new drawback that a cost is pushed up.

Further, it may be possible to adopt a method in which engaging projections are not formed on a shield plate, and the shield plate is mounted on an outer ring by making use of a C ring or the like which constitutes a separate member, for example. In this case, however, two parts consisting of the C ring and the shield plate become necessary and hence, a cost is liable to be pushed up.

The present invention has been made under such circumstances, and it is an object of the present invention to provide a rolling bearing provided with a shield plate which hardly induces the irregular deformation of an outer ring without increasing a cost, and a bearing device and an information recording and reproducing device which include such a rolling bearing.

To overcome these drawbacks, the present invention provides following means.

(1) According to one aspect of the present invention, there is provided a rolling bearing which includes: an inner ring and an outer ring which are arranged concentrically; a plurality of rolling bodies which are held between the inner ring and the outer ring in a rotatable manner; and an annular shield plate which is engageable with an engaging groove portion which is formed on an inner peripheral surface of the outer ring along the circumferential direction and opens toward an inner peripheral surface side and an open end side and closes a circular annular space defined between the outer ring and the inner ring; wherein the shield plate includes: an annular shield body where an inner peripheral portion surrounds the inner ring from the outside in the radial direction and an outer peripheral portion faces the outer ring; and a plurality of engaging projections which are arranged along the outer peripheral portion of the shield body, project outwardly in the radial direction from the outer peripheral portion in an inclined state, and are engageable with the engaging groove portion, and the engaging projection is deformable by bending in the orthogonal direction orthogonal to the in-plane direction of the shield body using a connecting portion of the engaging projection connected with the outer peripheral portion of the shield body as a start point, and is formed such that a projecting length of the engaging projection from the outer peripheral portion at both end portions in the circumferential direction is set shorter than the projecting length of the engaging projection from the outer peripheral portion at a center portion in the circumferential direction.

According to the rolling bearing of the present invention, the engaging projections are inserted into and engaged with the engaging groove portions so that the shield plate is mounted on the outer ring. Accordingly, a circular annular space defined between the outer ring and the inner ring can be closed by the shield plate so that the intrusion of dusts or the like into the inside of the rolling bearing or the leakage of grease, lubrication oil or the like to the outside can be suppressed.

In mounting the shield plate on the outer ring, the shield plate is overlapped to the outer ring such that the shield plate closes the circular annular space defined between the outer ring and the inner ring and, thereafter, the shield plate is pushed into the circular annular space. Due to such pushing, a plurality of engaging projections are fitted into the inside of the engaging groove portion while being deformed by bending in the orthogonal direction using the connecting portion of the engaging projection connected with the outer peripheral portion of the shield body as a start point. Then, when the shield plate is completely pushed into the inside of the engaging groove portion, the engaging projections elastically return by an elastic restoring force in the inside of the engaging groove portion and push an inner wall portion of the engaging groove portion. Accordingly, the engaging projections are caught by and are brought into an engagement state with the engaging groove portion so that the shield plate is mounted on the outer ring.

Particularly, the projecting length of the engaging projection from the outer peripheral portion of the shield body at both end portions in the circumferential direction is set shorter than the projecting length of the engaging projection from the outer peripheral portion of the shield body at the center portion in the circumferential direction. Accordingly, when the shield plate is mounted, different from the prior art, there is no possibility that both end portions of the engaging projection in the circumferential direction are locally brought into contact with the inner wall portion of the engaging groove portion and hence, the whole engaging projection is easily and uniformly brought into contact with the inner wall portion of the engaging groove portion.

Therefore, a force with which the engaging projection pushes the outer ring outwardly in the radial direction can be uniformly dispersed whereby the pushing force can be weakened as a result. Accordingly, the irregular deformation which causes the bulging of the outer ring outwardly in the radial direction hardly occurs so that it is possible to allow the outer ring to easily maintain circularity whereby harmful oscillations and a change of load torque hardly occur.

Further, it is unnecessary to decrease the length of the engaging projection along the circumferential direction and hence, the workability of the engaging projection can be maintained in the same manner as the prior art whereby there is no possibility that the cost of the shield plate is increased. The engaging projection is hardly deformed during transportation or the like and hence, the rigidity of the shield plate can be maintained in the same manner as the prior art, and the difficulty in removal of the shield plate from the outer ring can also be maintained. Further, no additional part such as a C ring is necessary and it is possible to surely mount the shield plate on the outer ring by means of one part, that is, the shield plate and hence, there is no possibility that a cost of the shield plate is pushed up.

(2) Further, in the above-mentioned rolling bearing of the present invention, the projecting length of the engaging projection may be gradually shortened toward both end portions in the circumferential direction from the center portion in the circumferential direction.

In this case, a portion of the engaging projection ranging from the center portion in the circumferential direction to both end portions in the circumferential direction is formed into a tapered shape and hence, it is possible to uniformly bring the whole engaging projection into contact with the inner wall portion of the engaging groove portion while securing a sufficient contact area between the engaging projection and the engaging groove portion. Accordingly, a force with which the engaging projection pushes the outer ring outwardly in the radial direction can be dispersed more efficiently and hence, the pushing force can be suppressed more easily.

(3) Further, in the above-mentioned rolling bearing of the present invention, a cutaway groove which extends toward a shield body side from the outer peripheral portion may be formed on the center portion of the engaging projection in the circumferential direction.

In this case, the engaging projection is brought into a circumferentially separated state by the cutaway groove and hence, the rigidity of the engaging projection can be lowered whereby the shield plate can be pushed into the engaging groove portion with a small force. Accordingly, the shield plate can be mounted on the outer ring more easily. Further, the engaging projection is in the circumferentially separated state by the cutaway groove and hence, when the shield plate is pushed into the engaging groove portion, a force in the circumferential direction which is transmitted to the engaging projection can be easily absorbed by making use of a gap defined by the cutaway groove. Accordingly, the whole engaging projection can be fitted on the inner wall portion of the engaging groove portion more easily.

(4) Further, in the above-mentioned rolling bearing of the present invention, the cutaway groove may go beyond the outer peripheral portion of the shield body and may extend toward the shield body side.

In this case, the cutaway groove extends to the shield body side and hence, the above-mentioned manner of operation and advantageous effect that the shield plate can be easily mounted and the force in the circumferential direction can be absorbed can be acquired more effectively.

(5) Further, in the above-mentioned rolling bearing of the present invention, two slits may be formed on the connecting portion of the engaging projection connected with the outer peripheral portion of the shield body along the outer peripheral portion toward the center portion in the circumferential direction from both end portions in the circumferential direction, and the engaging projection may be deformable by bending in the orthogonal direction using a connecting beam portion sandwiched between two slits as a start point.

In this case, since the engaging projection can be deformed by bending using the connecting beam portion sandwiched between two slits as the start point, the engaging projection can be easily bent so that it is possible to push the shield plate into the engaging groove portion with a smaller force whereby the shield plate can be more easily mounted.

Further, it is also possible to swing both end portions of the engaging projection in the circumferential direction by making use of the gap defined by the slits and hence, when the shield plate is pushed into the engaging groove portion, a force in the circumferential direction transmitted to the engaging projection can be easily absorbed. Accordingly, the whole engaging projection can be fitted on the inner wall portion of the engaging groove portion easily.

(6) Further, in the above-mentioned rolling bearing of the present invention, the engaging groove portion may be formed annularly over the whole inner peripheral surface of the outer ring.

In this case, the shield plate can be mounted on the outer ring without taking the relative circumferential positional relationship between the outer ring and the shield plate into consideration and hence, the shield plate exhibits the excellent assembling property.

(7) Further, in the above-mentioned rolling bearing of the present invention, the engaging projections may be arranged on the outer peripheral portion of the shield body equidistantly along the circumferential direction, and the number of engaging projections may be a prime number of 3 or more.

In this case, the engaging projections can be arranged equidistantly along the circumferential direction such that the engaging projections do not face each other in the diametrical direction with the axis of rotation of the outer ring sandwiched therebetween. Accordingly, there is no possibility that a pushing force is simultaneously transmitted to portions of the outer ring which face each other in the diametrical direction with the axis of rotation sandwiched therebetween from the engaging projections. Accordingly, the structure easily contributes to the maintenance of circularity of the outer ring.

(8) Further, in the above-mentioned rolling bearing of the present invention, the number of engaging projections and the number of rolling bodies may be in relation of prime numbers each other.

In this case, the number of engaging projections and the number of rolling bodies can be brought into relation of prime numbers, that is, the relation where the number of engaging projections and the number of rolling bodies have no common divisor except for 1 and hence, when the rolling bearing is viewed from the direction of the axis of rotation, it is possible to obviate an arrangement pattern where all rolling bodies and all engaging projections overlap with each other in the thickness direction of the rolling bearing and an arrangement pattern where all rolling bodies and all engaging projections do not overlap with each other in the thickness direction of the rolling bearing.

Assuming that the number of rolling bodies and the number of engaging projections are equal, the above-mentioned two arrangement patterns appear alternately during the use of the rolling bearing. In this case, the difference in pressure applied to the outer ring becomes large between two arrangement patterns and hence, the adverse influence which causes the irregular deformation of the outer ring is easily induced.

However, by bringing the number of rolling bodies and the number of engaging projections into relation of prime numbers, it is possible to prevent the above-mentioned two arrangement patterns from appearing alternately during the use of the rolling bearing.

(9) According to another aspect of the present invention, there is provided a bearing device which includes: the above-mentioned rolling bearing of the present invention; a shaft which is formed into a columnar shape and to which the inner ring is fixed; and a cylindrical sleeve which is arranged concentrically with the shaft and to which the outer ring is fixed.

According to the bearing device of the present invention, due to the provision of the above-mentioned rolling bearing, the smooth relative rotation can be ensured between the shaft and the sleeve without causing harmful oscillations and a change of a load torque. Accordingly, it is possible to provide the high-performance bearing device. Further, the bearing device is provided with the rolling bearing which hardly pushes up a cost and hence, it is possible to easily provide a low-cost bearing device.

(10) According to still another aspect of the present invention, there is provided an information recording and reproducing device which includes: the above-mentioned bearing device of the present invention; a carriage which is fitted on the sleeve, is rotatable around the shaft together with the sleeve, and includes an arm portion which supports a head gimbal assembly; a rotation drive part which rotates a magnetic recording medium in the predetermined direction; and an actuator which moves the head gimbal assembly toward the direction parallel to a surface of the magnetic recording medium by rotating the carriage.

According to the information recording and reproducing device of the present invention, due to the provision of the high-performance bearing device which secures the smooth relative rotation between the shaft and the sleeve, the arm portion can be moved smoothly and at a high speed so that a positional control of the head gimbal assembly with respect to a target truck of the magnetic recording medium can be accurately and easily performed thus easily realizing the information recording and reproducing device with high performance. Further, due to the provision of the low-cost bearing device, it is also possible to easily realize the low-cost information recording and reproducing device.

According to the rolling bearing of the present invention, while preventing a cost from being pushed up, the irregular deformation of the outer ring hardly occurs and hence, the circularity of the outer ring can be maintained whereby the harmful oscillations and a change of a load torque hardly occur.

Further, according to the bearing device and the information recording and reproducing device of the present invention, due to the provision of the above-mentioned rolling bearing, it is possible to realize the bearing device and the information recording and reproducing device with high performance at a low cost.

DETAILED DESCRIPTION OF THE INVENTION

Hereinafter, an embodiment of the present invention is explained in conjunction with FIG. 1 to FIG. 11. In this embodiment, the explanation is made with respect to a case where a bearing device is used as a pivot shaft of an information recording and reproducing device.

(Information Recording and Reproducing Device)

Figure 1:
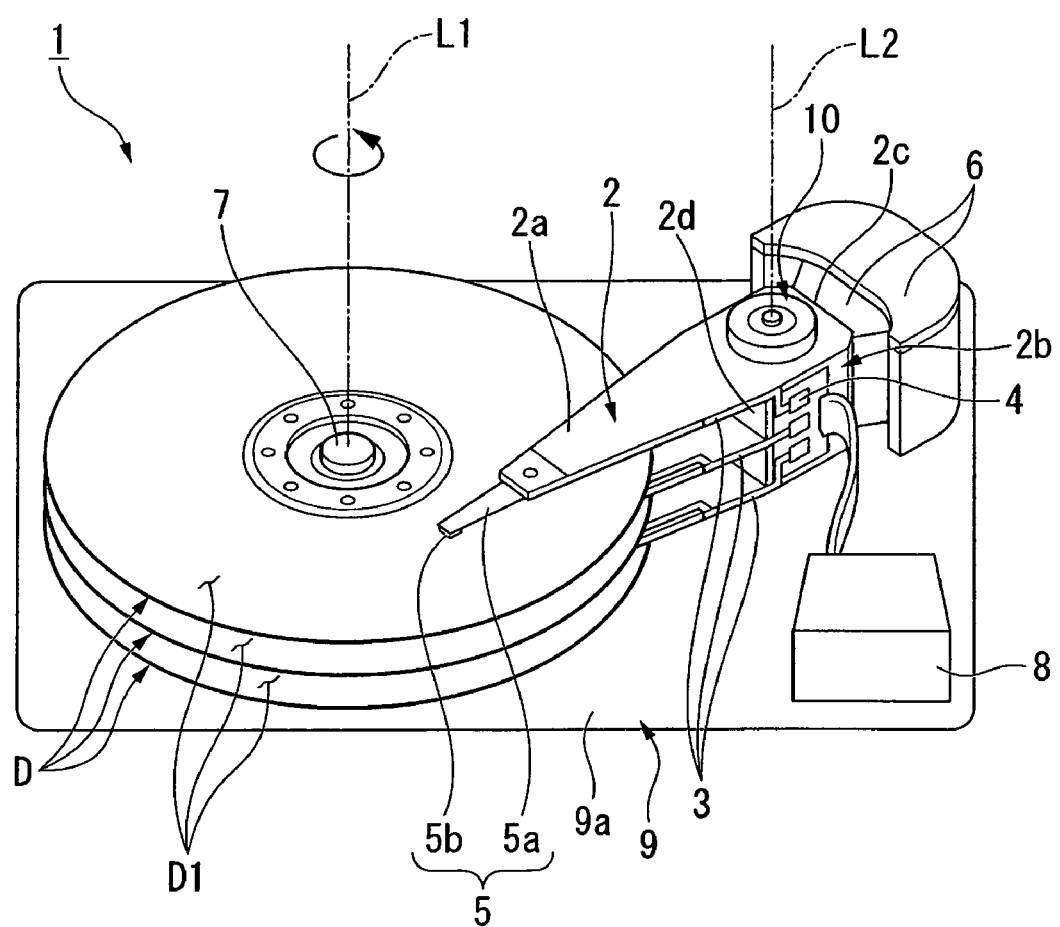
FIG. 1 is a perspective view showing an embodiment of an information recording and reproducing device according to the present invention.

As shown in FIG. 1, an information recording and reproducing device 1 of an embodiment of the present invention is a device which performs the writing of information on discs (magnetic recording mediums) D having a vertical recording layer by a vertical recording method. The information recording and reproducing device 1 includes a carriage 2, a laser beam source 4 which supplies an optical flux through an optical waveguide 3 from a proximal end side of the carriage 2, a head gimbal assembly (HGA) 5 which is supported on a distal end side of the carriage 2, an actuator 6 which moves the head gimbal assembly 5 for scanning in the horizontal in-plane direction parallel to disc surfaces D1 (surfaces of the discs D), a spindle motor (rotary drive part) 7 which rotates the discs D in the predetermined direction about an axis of rotation L1, a control part 8 which supplies an electric current which is modulated corresponding to information to a slider 5b of the head gimbal assembly 5, and a housing 9 which houses the respective constitutional parts therein.

The housing 9 is made of metal material such as aluminum and has a box shape with a top thereof opened. The housing 9 is constituted of a bottom portion 9a having a quadrangular shape as view in a top plan view, and a peripheral wall (not shown in the drawing) which is raised upright from a periphery of the bottom portion 9a in the vertical direction with respect to the bottom portion 9a. A recessed portion which houses the above-mentioned respective constitutional parts therein is formed inside the peripheral wall.

In FIG. 1, to facilitate the explanation of the information recording and reproducing device 1, the peripheral wall which surrounds the periphery of the housing 9 is omitted.

A lid not shown in the drawing is detachably fixed to the housing 9 so as to close an upper opening portion of the housing 9. The spindle motor 7 is mounted on the approximately center of the bottom portion 9a, and the discs D are detachably fixed to the spindle motor 7 by allowing an inner wall portion of a center hole of the disc D to be fitted on the spindle motor 7.

The above-mentioned actuator 6 is mounted on one corner portion of the bottom portion 9a and outside the disc D. The carriage 2 which is rotatable in a horizontal plane about the pivot shaft 10, that is, about an axis of rotation L2, is mounted on the actuator 6.

The carriage 2 is an integral body formed of arm portions 2a which extend toward a distal end portion thereof (toward the disc D) from a proximal end portion thereof, and a base portion 2b which supports the head gimbal assemblies 5 in a cantilever manner by way of the arm portions 2a. The carriage 2 which is an integral body is formed by shaving or the like. The base portion 2b is formed into an approximately rectangular parallelepiped shape, and is rotatably supported about the pivot shaft 10. That is, the base portion 2b is connected to the actuator 6 by way of the pivot shaft 10, and the pivot shaft 10 constitutes the center of rotation of the carriage 2.

The arm portions 2a are planar members which extend parallel to the in-plane direction (the horizontal in-plane direction) of an upper surface of the base portion 2b on a side surface 2d of the base portion 2b opposite to a side surface 2c on which the actuator 6 is mounted (a side surface on a side opposite to the corner portion). Three sheets of arm portions 2a extend while being arranged along the height direction of the base portion 2b (the vertical direction).

To be more specific, each arm portion 2a is formed into a tapered shape which is gradually tapered as the arm portion 2a extends from the proximal end portion to the distal end portion, and the arm portions 2a are arranged such that each disc D is sandwiched between the neighboring arm portions 2a. That is, the arm portions 2a are configured such that the arm portion 2a and the disc D can be arranged alternately, and the arm portions 2a are movable in the direction parallel to the disc surface D1 (the horizontal in-plane direction) due to the driving of the actuator 6.

The carriage 2 and the head gimbal assembly 5 are configured to be retracted from the discs D due to the driving of the actuator 6 when the rotation of the discs D is stopped.

The head gimbal assembly 5 is connected to a distal end of the arm portion 2a, and includes a suspension 5a and the slider 5b which is mounted on the distal end of the suspension 5a. Further, the head gimbal assembly 5 guides an optical flux from the laser light source 4 to the slider 5b having a near-field light generation element not shown in the drawing thus allowing the slider 5b to generate a near-field light, and allows the disc D to record and reproduce various information by making use of the near-field light.

The near-field light generation element is constituted of an optical minute opening, a projecting portion which is formed in a nanometer size or the like, for example.

(Pivot Shaft)

Figure 2:
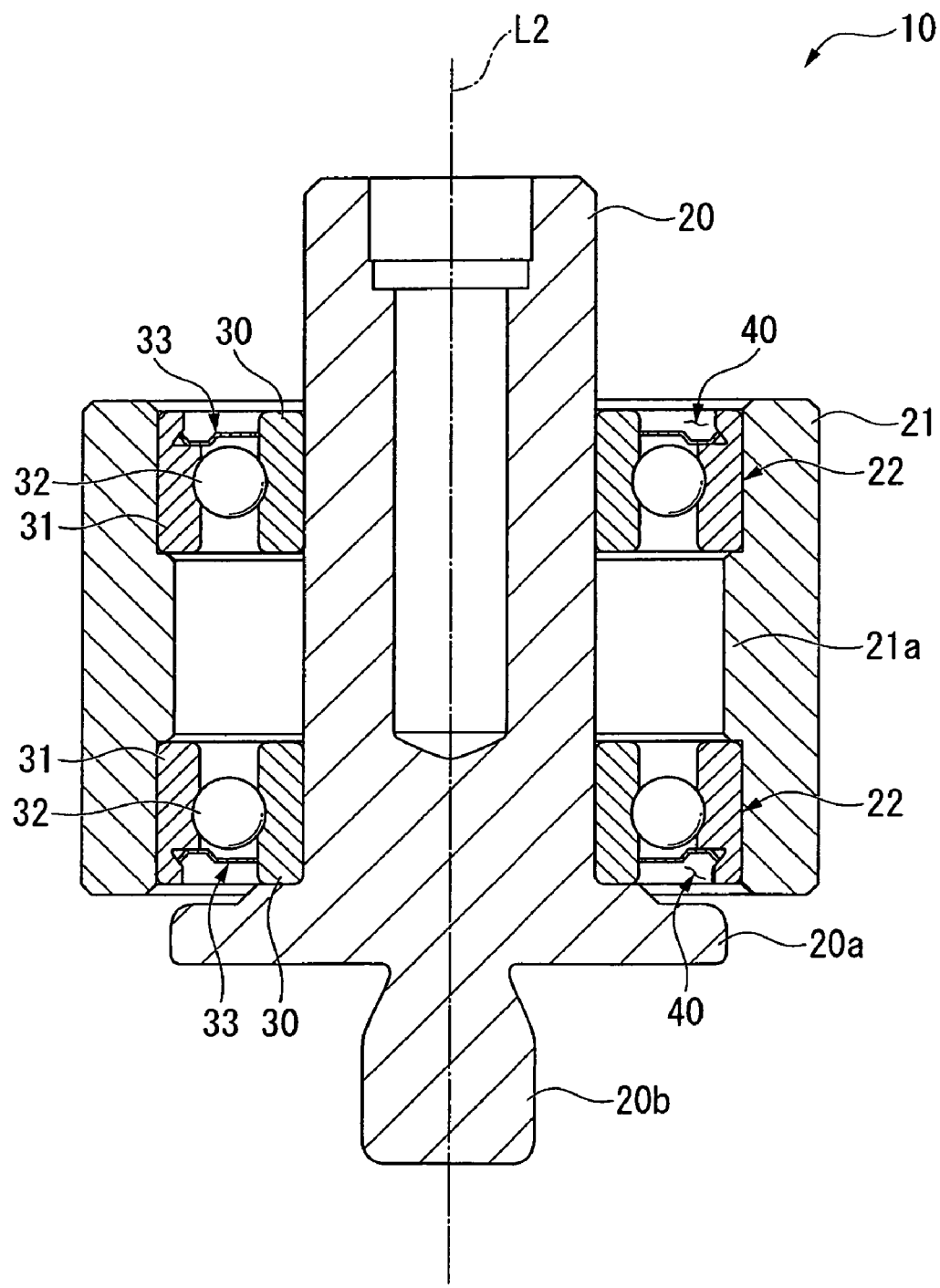
FIG. 2 is a longitudinal cross-sectional view of a pivot shaft of the information recording and reproducing device shown in FIG. 1.

As shown in FIG. 2, the pivot shaft 10 includes an approximately columnar shaft 20 which is raised upright from the bottom portion 9a of the housing 9, an approximately cylindrical sleeve 21 which surrounds the shaft 20 from the outside in the radial direction and is arranged concentrically with the shaft 20, and two rolling bearings 22 which are interposed between the shaft 20 and the sleeve 21.

The shaft 20 is an approximately columnar rod-like member which extends along the axis of rotation L2, and a portion of the shaft 20 disposed on a bottom portion 9a side of the housing 9 constitutes a proximal end portion, and a portion of the shaft 20 disposed on a side opposite to the proximal end portion in the axial direction constitutes a distal end portion.

In this embodiment, the direction orthogonal to the axis of rotation L2 is referred to as the diametrical direction or the radial direction, and the direction which goes around the axis of rotation L2 is referred to as the circumferential direction.

On the proximal end portion of the shaft 20, a flange portion 20a which has a diameter larger than a diameter of the shaft 20 and a small-diameter portion 20b which has a diameter smaller than the diameter of the shaft 20 are contiguously formed in this order toward an end portion. Male threads not shown in the drawing are formed on the small-diameter portion 20b, and the male threads are threadedly engaged with female threads not shown in the drawing which are formed on the bottom portion 9a of the housing 9.

Due to such constitution, the shaft 20 is raised upright from the bottom portion 9a of the housing 9. Here, a lower surface of the flange portion 20a is brought into contact with the bottom portion 9a of the housing 9 and hence, the positioning of the shaft 20 in the height direction is carried out.

The sleeve 21 is a member which is formed into an approximately cylindrical shape, wherein an inner peripheral surface of the sleeve 21 is spaced apart from an outer peripheral surface of the shaft 20 and has the approximately same diameter as the flange portion 20a. Further, two rolling bearings 22 are arranged in the sleeve 21, and a spacer portion 21a which holds a gap defined between two rolling bearings 22 at a predetermined distance in the axial direction is formed on the sleeve 21 in a projecting manner toward the inside in the radial direction.

Further, the sleeve 21 is integrally assembled with the carriage 2 in such a manner that the sleeve 21 is press-fitted into or is fitted into and is adhered to a mounting hole not shown in the drawing which is formed in the base portion 2b of the carriage 2.

Figure 3:
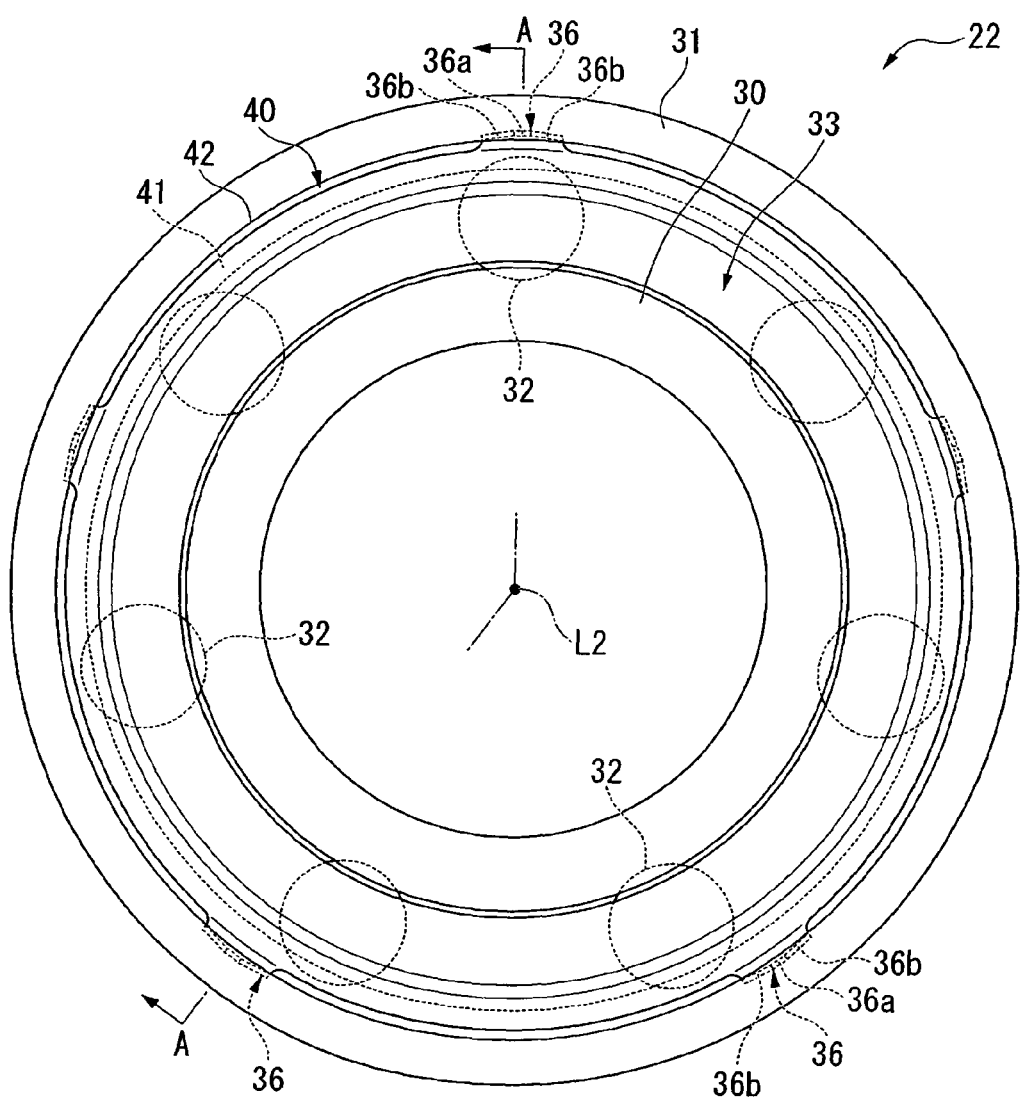
FIG. 3 is a plan view of a rolling bearing which constitutes a part of the pivot shaft shown in FIG. 2.
Figure 4:
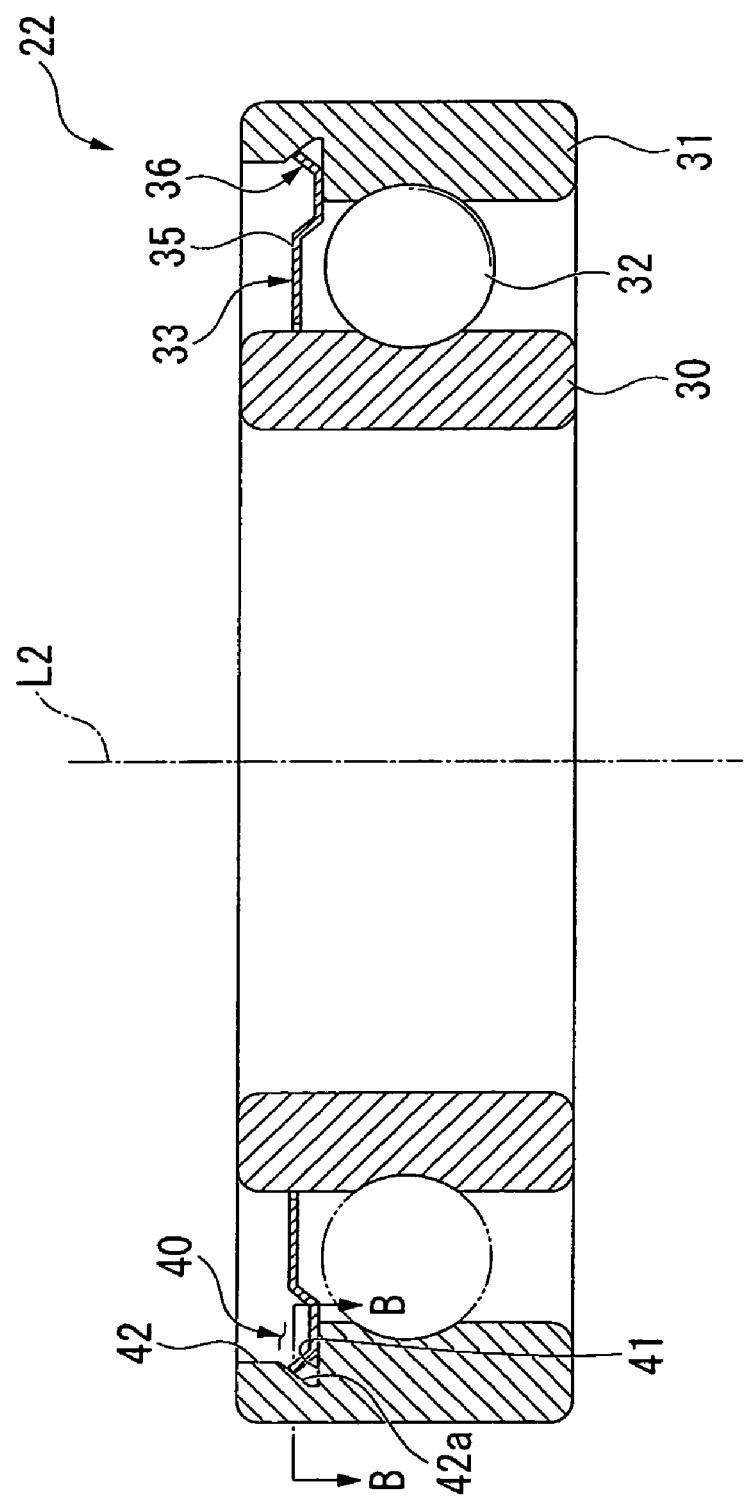
FIG. 4 is a cross-sectional view of the rolling bearing taken along a line A-A in FIG. 3.

The above-mentioned two rolling bearings 22 are respectively formed of a bearing provided with a shield plate and have the same constitution. As shown in FIG. 3 and FIG. 4, each rolling bearing 22 is constituted of an inner ring 30 which is fixed to the shaft 20, an outer ring 31 which is arranged concentrically with the inner ring 30 and is fixed to the sleeve 21, a plurality of rolling bodies 32 which are held between the inner ring 30 and the outer ring 31 in a rotatable manner, and an annular shield plate 33 which closes a circular annular space defined between the inner ring 30 and the outer ring 31.

Here, the rolling bearing 22 of this embodiment is a bearing to which a preload is applied in the axial direction along an axis of the shaft 20. That is, to one of the outer ring 31 and the inner ring 30, a preload is applied in the axial direction with respect to the other of the outer ring 31 and the inner ring 30.

In this embodiment, the explanation is made with respect to a case where the rolling bodies 32 are formed of balls. Further, these rolling bodies 32 are held in a rotatable manner by a retainer not shown in the drawing, and the number of rolling bodies 32 is set to 7 which is a prime number larger than 2.

Further, the shield plate 33 of this embodiment is mounted on the outer ring 31 so as to close the circular annular space defined between the inner ring 30 and the outer ring 31 from an opening portion side of the sleeve 21 (see FIG. 2). To be more specific, the shield plate 33 is mounted on the outer ring 31 by engaging a plurality of engaging projections 36 with an engaging groove portion 40 formed on the outer ring 31.

Here, the shield plate 33 and the engaging groove portion 40 are explained in detail.

Figure 5:
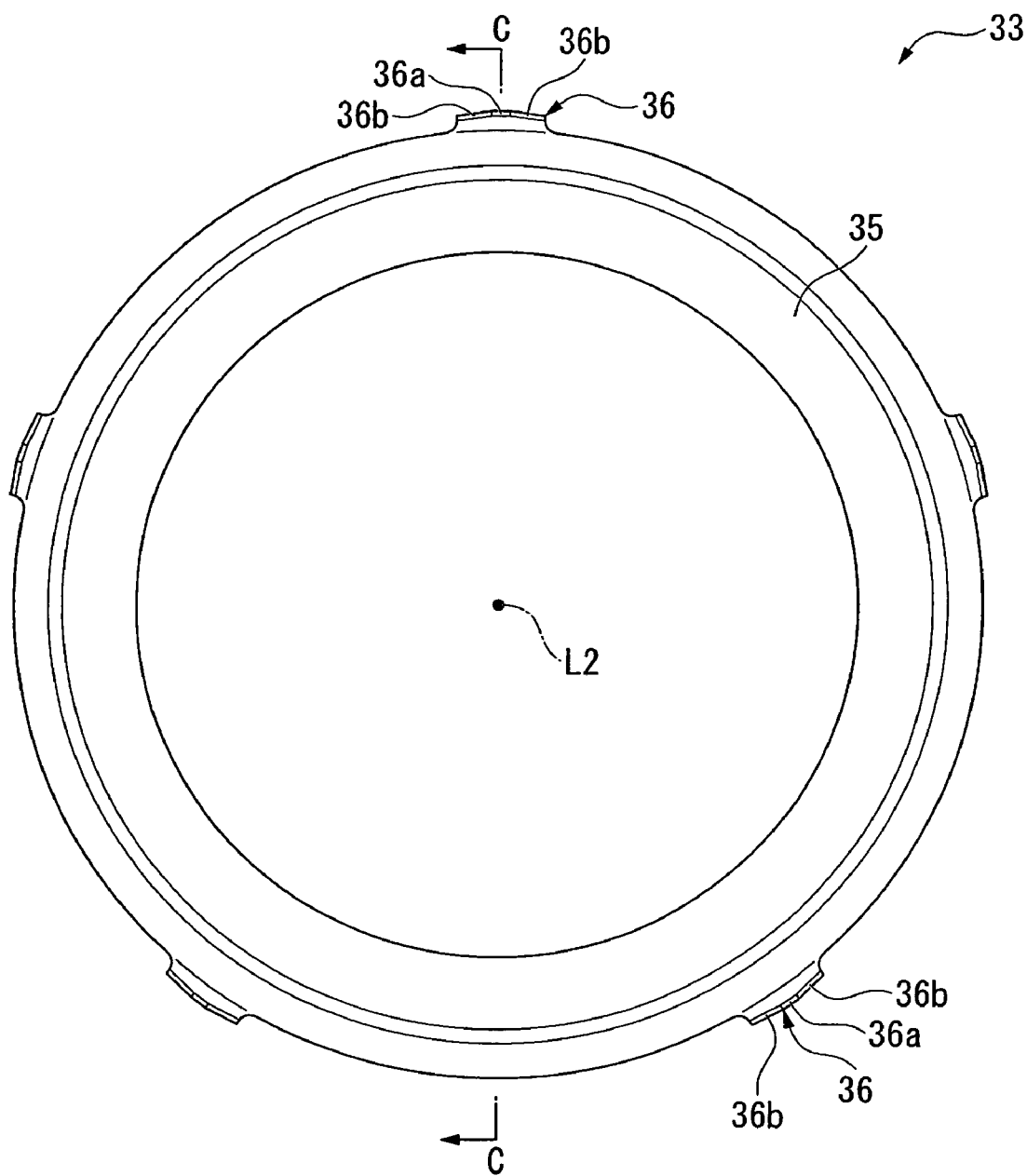
FIG. 5 is a plan view of a shield plate which constitutes a part of the rolling bearing shown in FIG. 3.
Figure 6:
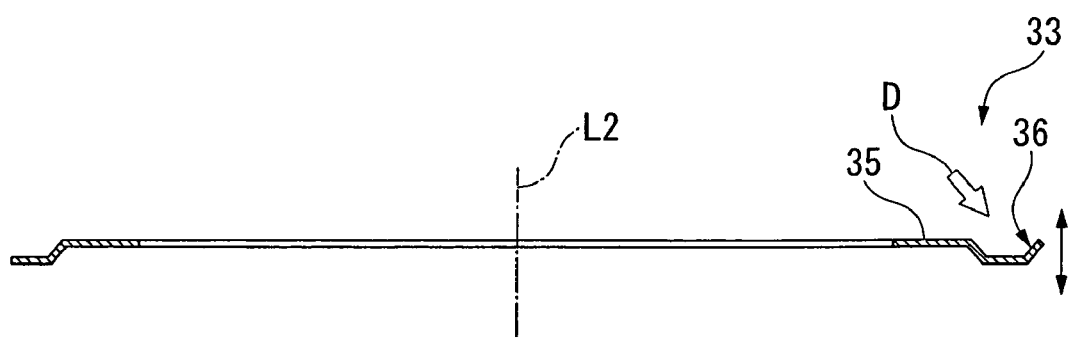
FIG. 6 is a cross-sectional view of the shield plate taken along a line C-C in FIG. 5.

Firstly, as shown in FIG. 5 and FIG. 6, the shield plate 33 is constituted of an annular shield body 35 which extends in the in-plane direction orthogonal to the axis of rotation L2, and a plurality of engaging projections 36 which are arranged on an outer peripheral portion of the shield body 35 in the circumferential direction and project outwardly in the radial direction in an inclined state from the outer peripheral portion.

The shield body 35 is formed such that an inner peripheral portion surrounds the inner ring 30 from the outside in the radial direction, and an outer peripheral portion faces the outer ring 31 (see FIG. 3 and FIG. 4). The outer peripheral portion is formed of a stepped portion having an approximately Z shaped cross section so as to enhance the rigidity of the shield body 35.

The plurality of engaging projections 36 are arranged on the outer peripheral portion of the shield body 35 equidistantly along the circumferential direction. In this embodiment, 5 engaging projections 36 are arranged. Accordingly, the number of rolling bodies 32 (7 pieces) and the number of engaging projections 36 (5 pieces) are in relation of prime numbers each other.

Figure 7:
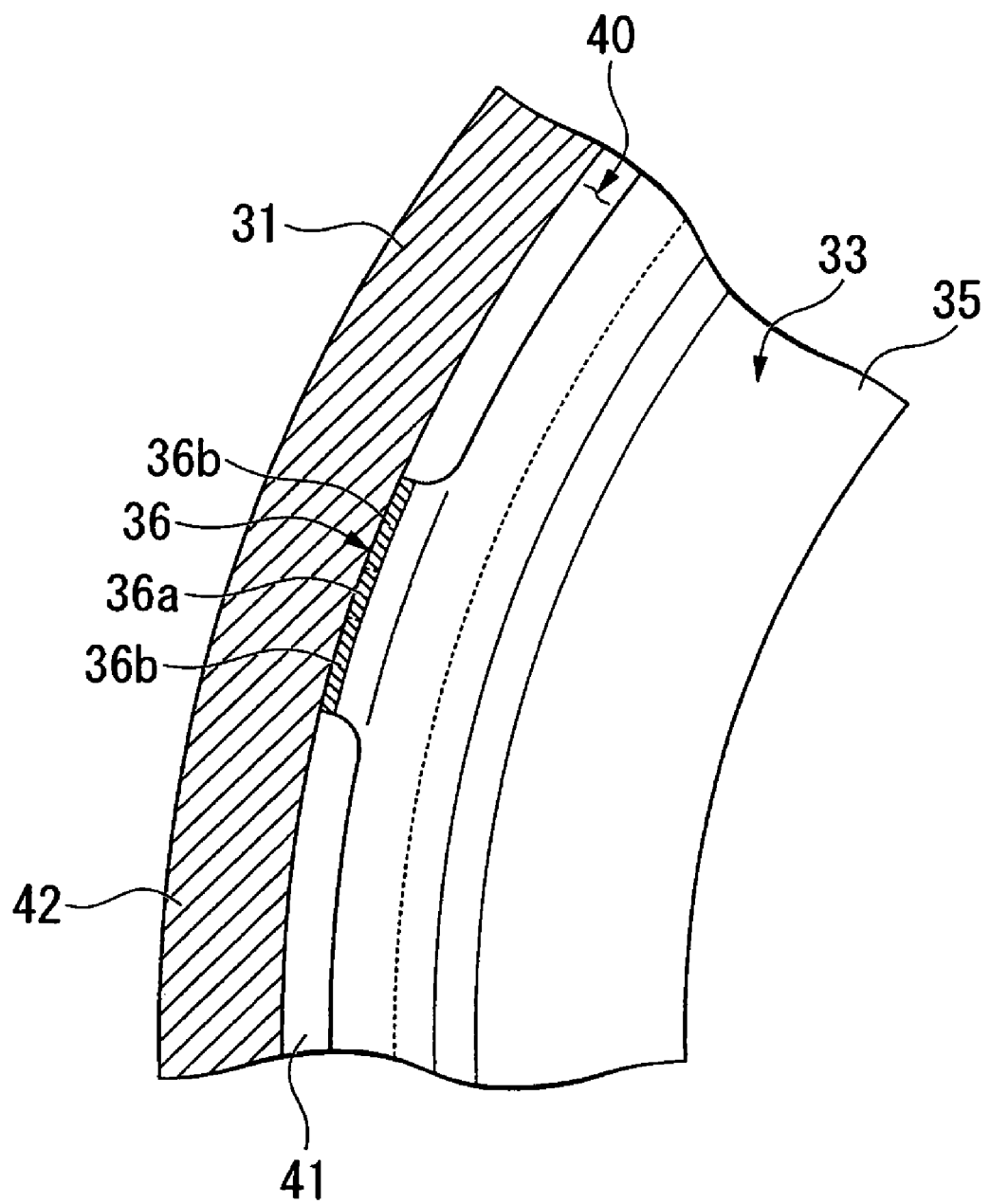
FIG. 7 is a cross-sectional view taken along a line B-B shown in FIG. 4.

These engaging projections 36 are deformable by bending in the orthogonal direction (in the direction indicated by an arrow in FIG. 6) orthogonal to the in-plane direction of the shield body 35 using a connecting portion of the engaging projection 36 connected with the outer peripheral portion of the shield body 35 as a start point. Further, as shown in FIG. 4 and FIG. 7, the engaging projections 36 are uniformly brought into contact with an inner wall portion of the engaging groove portion 40 in a state where the engaging projections 36 are fitted into the inside of the engaging groove portion 40 of the outer ring, and push the inner wall portion outwardly in the radial direction. Due to such constitution, the engaging projections 36 are surely inserted into and are engaged with the engaging groove portion 40. Eventually, the shield plate 33 is mounted on the outer ring 31.

Figure 8:
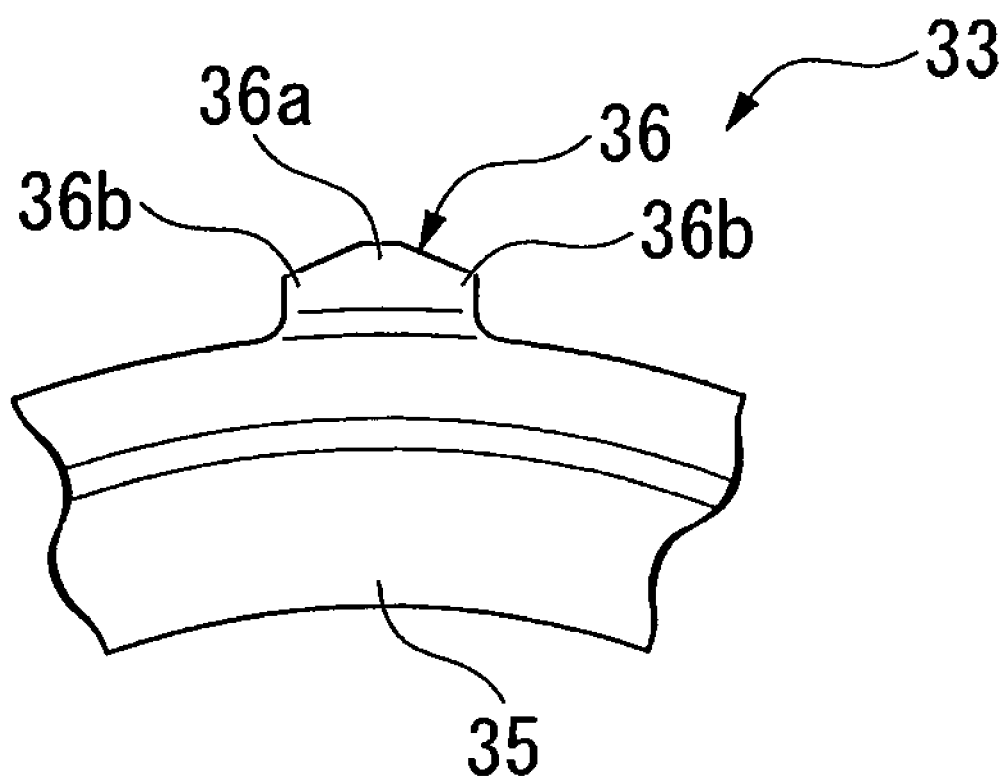
FIG. 8 is a partial plan view of the shield plate as viewed in the direction indicated by an arrow D shown in FIG. 6.

Particularly, as shown in FIG. 8, the engaging projection 36 of this embodiment is formed such that a projecting length of the engaging projection 36 from the outer peripheral portion of the shield body 35 at both end portions 36b in the circumferential direction is set shorter than the projecting length of the engaging projection 36 from the outer peripheral portion of the shield body 35 at the center portion 36a in the circumferential direction. Further, the engaging projection 36 is formed into a tapered shape in which the projecting length is gradually shortened as the portion extends from the center portion 36a in the circumferential direction to both end portions 36b in the circumferential direction.

Next, as shown in FIG. 3 and FIG. 4, the engaging groove portion 40 of this embodiment is annularly formed over the whole inner peripheral surface of the outer ring 31 and has a stepped portion so that the engaging groove portion 40 opens on an inner peripheral surface side and on an opening end periphery side of the outer ring 31.

That is, the engaging groove portion 40 is defined by a bottom wall portion 41 which is parallel to the in-plane direction of the shield plate 33 and is contiguously connected with an inner peripheral surface of the outer ring 31, and an inner wall portion 42 which contiguously connects the bottom wall portion 41 and the open end periphery of the outer ring 31 to each other.

Further, a portion of the inner wall portion 42 which is contiguously connected to the bottom wall portion 41 forms a guiding surface 42a which is formed into an inverse tapered shape whose diameter is gradually enlarged as the portion extends from the open end periphery toward the bottom wall portion 41.

(Method of Mounting Shield Plate)

Next, the explanation is made with respect to a method of mounting the shield plate 33 on the outer ring 31 in the rolling bearing 22 having the above-mentioned constitution.

Figure 9:
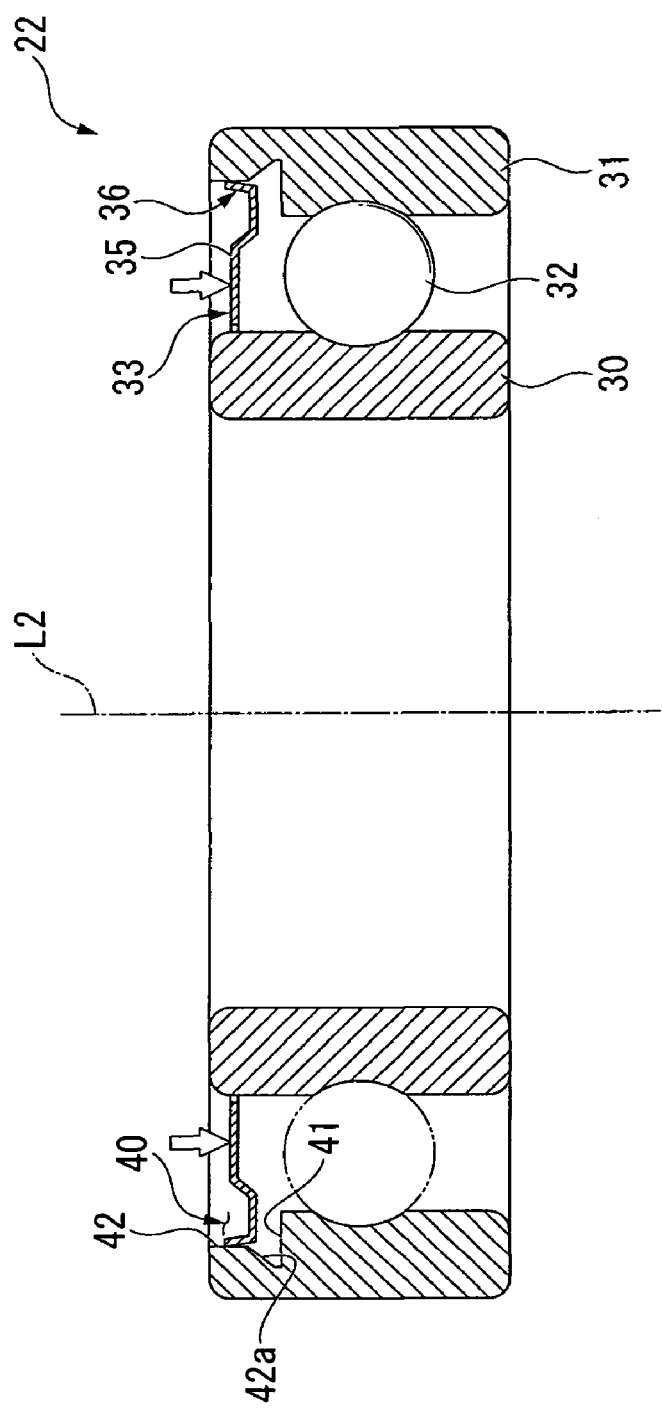
FIG. 9 is a view showing one step in which the shield plate shown in FIG. 5 is mounted on an outer ring, and is a cross-sectional view showing a state where the shield plate is pushed into a circular annular space defined between the outer ring and an inner ring.

Firstly, the shield plate 33 is placed on the outer ring 31 in an overlapping manner such that the shield plate 33 closes the circular annular space defined between the outer ring 31 and the inner ring 30 and, thereafter, the shield plate 33 is pushed into the inside of the circular annular space. Due to such pushing, as shown in FIG. 9, the plurality of engaging projections 36 are fitted into the engaging groove portion 40 while being deformed by bending in the orthogonal direction using the outer peripheral portion of the shield body 35 as a start point. Then, when the shield plate 33 is completely pushed into the inside of the engaging groove portion 40, as shown in FIG. 4 and FIG. 7, the engaging projections 36 elastically return in the inside of the engaging groove portion 40 due to an elastic restoring force so that the engaging projections 36 push against the inner wall portion 42 of the engaging groove portion 40 outwardly in the radial direction. Accordingly, the engaging projections 36 are caught by and are brought into an engagement state with the guiding surface 42a of the engaging groove portion 40 so that the shield plate 33 is mounted on the outer ring 31.

As described above, the shield plate 33 can be mounted on the outer ring 31 by simply pushing the shield plate 33 into the engaging groove portion. Further, by mounting the shield plate 33 on the outer ring 31, the circular annular space defined between the outer ring 31 and the inner ring 30 can be closed so that the intrusion of dusts or the like into the inside of the rolling bearing or the leakage of grease, lubrication oil or the like to the outside can be suppressed.

Particularly, the engaging projection 36 of this embodiment is formed such that the projecting length of the engaging projection 36 from the outer peripheral portion of the shield body 35 at both end portions 36b in the circumferential direction is set shorter than the projecting length of the engaging projection 36 from the outer peripheral portion of the shield body 35 at the center portion in the circumferential direction. Accordingly, when the shield plate 33 is mounted on the outer ring 31, different from the prior art, there is no possibility that both end portions 36b of the engaging projection 36 in the circumferential direction are locally brought into contact with the inner wall portion 42 of the engaging groove portion 40 and hence, as shown in FIG. 7, the whole engaging projection 36 is easily and uniformly brought into contact with the inner wall portion 42 of the engaging groove portion 40.

Therefore, a force with which the engaging projection 36 pushes the outer ring 31 outwardly in the radial direction can be uniformly dispersed whereby the pushing force can be weakened. Further, portions of the engaging projection 36 ranging from the center portion 36a in the circumferential direction to both end portions 36b in the circumferential direction are formed into a tapered shape and hence, it is possible to bring the whole engaging projection 36 into contact with the engaging groove portion 40 uniformly while securing a sufficient contact area between the engaging projection 36 and the engaging groove portion 40. Due to such a constitution, the pushing force can be suppressed at a low level more easily.

Accordingly, the irregular deformation which causes the bulging of the outer ring 31 outwardly in the radial direction hardly occurs so that it is possible to allow the outer ring 31 to easily maintain circularity whereby harmful oscillations and a change of a load torque hardly occur.

Further, it is unnecessary to decrease the length of the engaging projection 36 along the circumferential direction and hence, the workability of the engaging projection 36 can be maintained in the same manner as the prior art whereby there is no possibility that the cost of the shield plate 33 is increased. Further, the engaging projections 36 are hardly deformed during transportation or the like and hence, the rigidity of the shield plate 33 can be maintained in the same manner as the prior art, and the difficulty in the removal of the shield plate 33 from the outer ring 31 can be also maintained.

In addition, since the pushing force can be weakened, the defective appearance such as the distortion of the shield plate 33 hardly occurs and a possibility that the shield plate 33 is brought into contact with other parts (for example, a retainer and the like) becomes small. Further, no additional part such as a C ring is necessary and it is possible to surely mount the shield plate 33 on the outer ring 31 by means of one part of the shield plate 33 and hence, there is no possibility that the cost of the shield plate 33 is pushed up.

In addition, since the pushing force can be weakened, the defective appearance such as the distortion of the shield plate 33 hardly occurs and a possibility that the shield plate 33 is brought into contact with other parts (for example, a retainer and the like) becomes small. Further, no additional part such as a C ring is necessary and it is possible to surely mount the shield plate 33 on the outer ring 31 by means of one part of the shield plate 33 and hence, there is no possibility that the cost of the shield plate 33 is increased.

Further, five engaging projections 36 are formed on the outer peripheral portion of the shield plate 33 equidistantly and hence, there is no possibility that the engaging projections 36 face each other in the diametrical direction with the axis of rotation L2 sandwiched therebetween as shown in FIG. 3. Accordingly, there is no possibility that a pushing force is simultaneously transmitted to portions of the outer ring 31 which face each other in the diametrical direction with the axis of rotation L2 sandwiched therebetween from the engaging projections 36. Accordingly, the structure easily contributes to the maintenance of circularity of the outer ring 31.

Further, 7 rolling bodies 32 and 5 engaging projections 36 are used in combination and hence, the number of rolling bodies 32 and the number of engaging projections 36 are brought into relation of prime numbers. Accordingly, when the rolling bearing 22 is viewed from the direction of the axis of rotation L2, it is possible to avoid an arrangement pattern where all rolling bodies 32 and all engaging projections 36 do not overlap with each other in the thickness direction of the rolling bearing 22.

Assuming that the number of rolling bodies 32 and the number of engaging projections 36 are equal number of 5 or more, the above-mentioned two arrangement patterns appear alternately during the use of the rolling bearing 22. In this case, the difference in pressure applied to the outer ring 31 becomes large between two arrangement patterns and hence, the adverse influence which causes the irregular deformation on the outer ring 31 is easily exerted. However, by bringing the number of rolling bodies 32 and the number of engaging projections 36 into relation of prime numbers, it is possible to prevent the above-mentioned two arrangement patterns from appearing alternately during the use of the rolling bearing 22.

According to the pivot shaft 10 provided with the above-mentioned two rolling bearings 22, it is possible to establish the smooth relative rotation between the shaft 20 and the sleeve 21 without generating harmful oscillations and a change of a load torque. Accordingly, it is possible to provide the pivot shaft 10 with high performance. Further, the rolling bearing 22 also hardly pushes up a cost and hence, it is possible to easily realize a low-cost bearing device.

Further, according to the information recording and reproducing device 1 provided with such a pivot shaft 10, the arm portion 2a can be moved smoothly and at a high speed, and a positional control of the head gimbal assembly 5 with respect to a target track of the disc D can be accurately and easily performed thus enhancing the performance of the information recording and reproducing device 1. Further, due to the provision of the low-cost pivot shaft 10, it is also possible to easily realize the low-cost information recording and reproducing device 1.

The technical scope of the present invention is not limited to the above-mentioned embodiment and various modifications can be made without departing from the gist of the present invention.

For example, although the explanation has been made with respect to the case where the bearing device is applied to the pivot shaft 10 of the information recording and reproducing device which uses a near-field light as an example in the above-mentioned embodiment, the present invention is not limited to such a case, and the present invention is applicable to a bearing device of an HDD, an optical disc device or the like for general-use purpose or a rotary shaft part of various devices.

In the above-mentioned embodiment, one sheet of shield plate 33 is mounted on the outer ring 31, and one side of the circular annular space defined between the outer ring 31 and the inner ring 30 is closed. However, the bearing device may be configured such that two sheets of shield plates 33 are mounted on the outer ring 31 such that the shield plates 33 are positioned at both ends of rolling bodies 32 and close both sides of the circular annular space defined between the outer ring 31 and the inner ring 30.

Although the number of engaging projections 36 of the shield plate 33 is set to 5 in the above-mentioned embodiment, the number of engaging projections 36 is not limited to such a number, and may be set freely. However, the number of engaging projections 36 may preferably be a prime number of 3 or more from a viewpoint that the engaging projections 36 can be arranged without facing each other in the diametrical direction with the axis of rotation L2 sandwiched therebetween, and a prime number of 3 or more of the engaging projections 36 is likely to contribute to circularity of the outer ring 31.

Although the rolling bodies 32 are formed of balls in the above-mentioned embodiment, the rolling bodies 32 are not limited to balls and may be formed of rollable members such as rollers. Further, although the number of rolling bodies 32 is set to 7 in the above-mentioned embodiment, the number of rolling bodies 32 is not limited to such a number and may be freely set.

However, it is preferable that the number of engaging projections 36 and the number of rolling bodies 32 are combined such that the number of engaging projections 36 and the number of rolling bodies 32 are brought into a different relation of prime numbers. For example, besides the above-mentioned combination of the prime numbers where the number of engaging projections 36 is 5 and the number of rolling bodies 32 is 7, it may be possible to adopt the combination of a prime number and an odd number where the number of engaging projections 36 is 5 and the number of rolling bodies 32 is 9, the combination of odd numbers where the number of engaging projections 36 is 9 and the number of rolling bodies 32 is 25, and the combination of an odd number and an even number where the number of engaging projections 36 is 9 and the number of rolling bodies 32 is 16.

Although the engaging projection 36 is formed such that the portion ranging from the center portion 36a in the circumferential direction to both end portions 36b in the circumferential direction is formed into a tapered shape, the shape of the engaging projection 36 is not limited to such a shape, and it is sufficient that a projecting length of the engaging projection 36 from the outer peripheral portion at both end portions 36b in the circumferential direction is set shorter than a projecting length of the engaging projection 36 from the outer peripheral portion at the center portion 36a in the circumferential direction. For example, the portion ranging from the center portion 36a in the circumferential direction to both end portions 36b in the circumferential direction may be formed into a stepped shape or a smooth curved shape.

Figure 10:
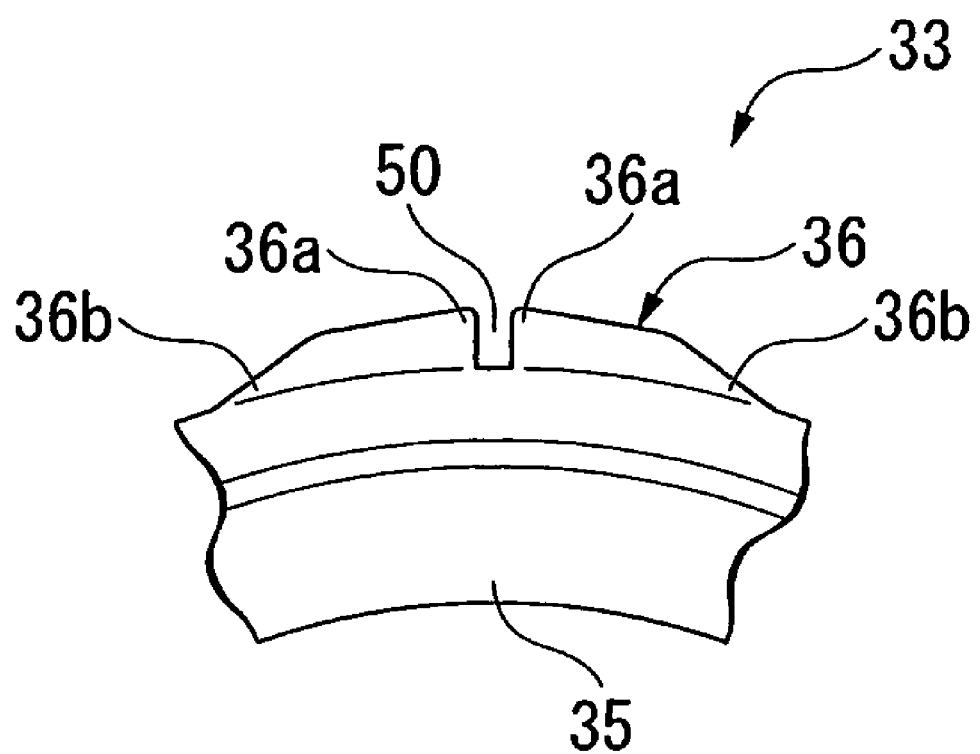
FIG. 10 is a view showing a modification of an engaging projection of the shield plate according to the present invention.

As shown in FIG. 10, a cutaway groove 50 which extends toward the shield body 35 from the outer peripheral portion may be formed on the center portion 36a of the engaging projection 36 in the circumferential direction.

In this case, the engaging projection 36 is brought into a circumferentially separated state by the cutaway groove 50 and hence, the rigidity of the engaging projection 36 can be lowered whereby the shield plate 33 can be pushed into the engaging groove portion 40 with a small force. Accordingly, the shield plate 33 can be mounted more easily. Further, since the engaging projection 36 is in the circumferentially separated state by the cutaway groove 50, when the shield plate 33 is pushed into the engaging groove portion 40, a force in the circumferential direction which is transmitted to the engaging projection 36 can be easily absorbed by making use of a gap defined by the cutaway groove 50. Accordingly, the whole engaging projection 36 can be fitted on the inner wall portion 42 of the engaging groove portion 40 more easily.

Further, the rigidity of the engaging projection 36 can be lowered by the cutaway groove 50, the engaging projection can be easily formed in an elongated manner in the circumferential direction and hence, a catching performance of the engaging projection 36 with the engaging groove portion 40 can be enhanced.

It is preferable that a length of the cutaway groove 50 goes beyond the outer peripheral portion of the shield body 35 and extends toward the shield body 35 side as shown in FIG. 10. However, the cutaway groove 50 may fall within the engaging projection 36 in length.

Figure 11:
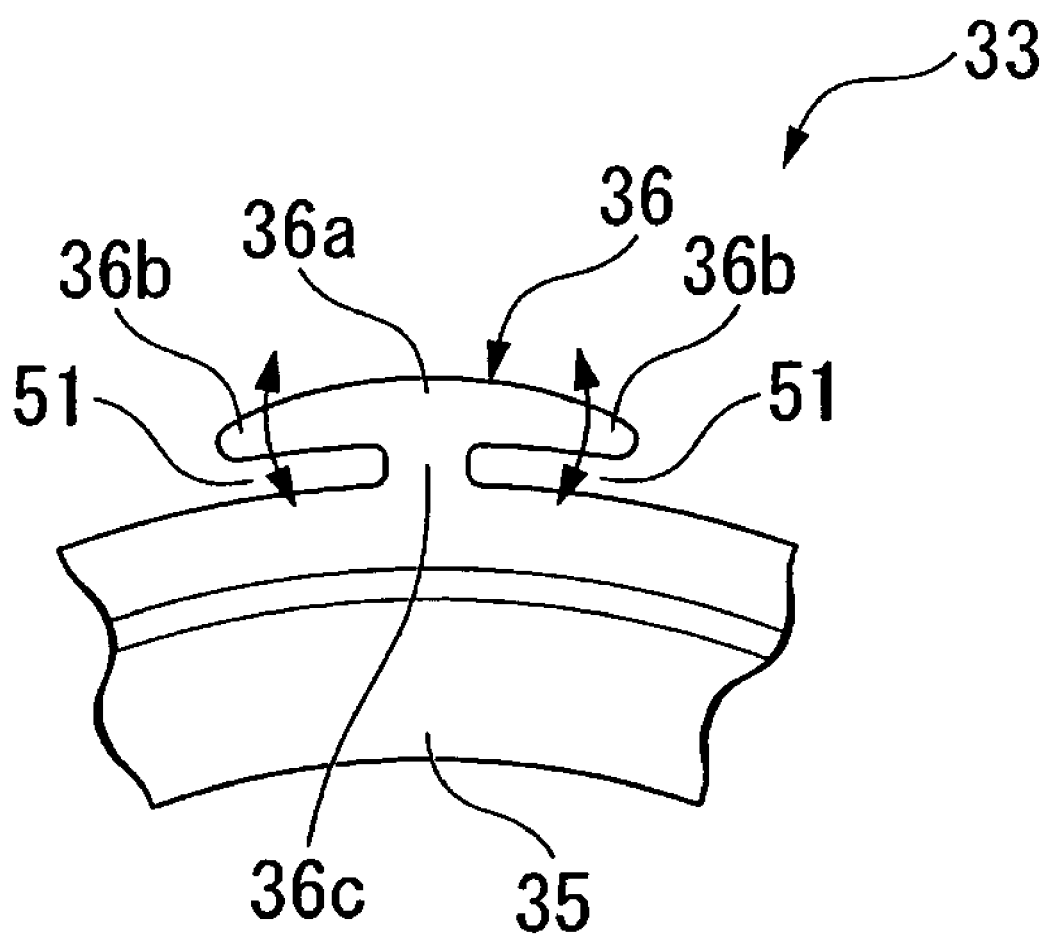
FIG. 11 is a view showing another modification of the engaging projection of the shield plate according to the present invention.
Figure 12:
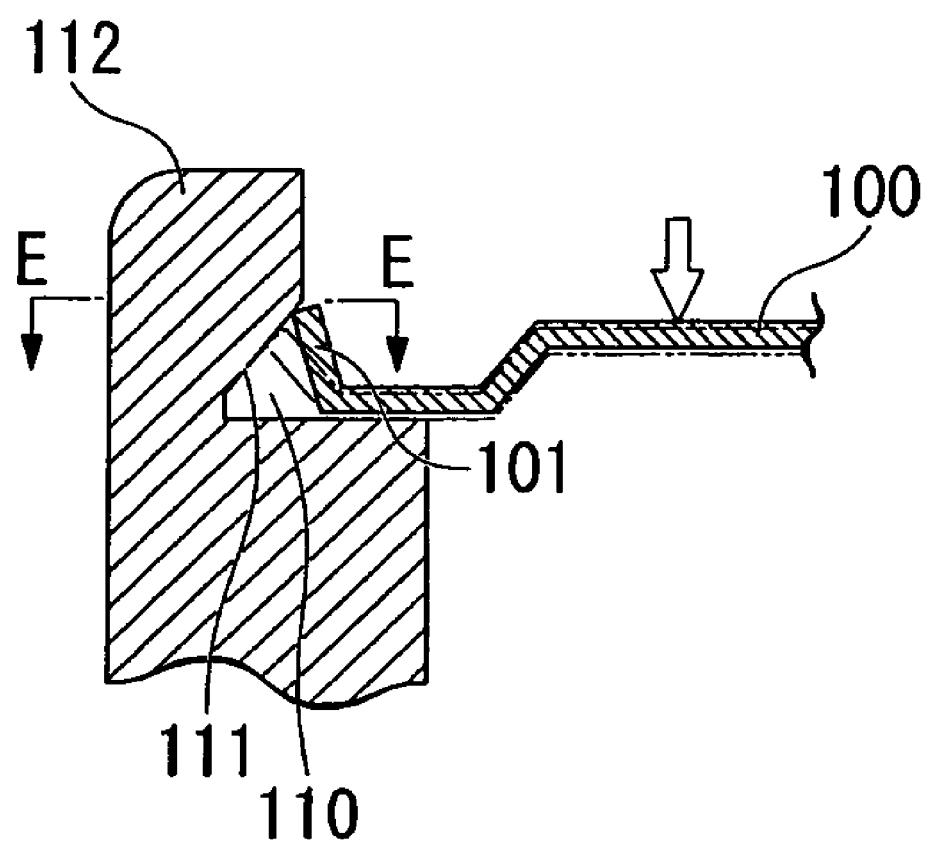
FIG. 12 is a cross-sectional view showing one step in which a conventional shield plate is mounted on an outer ring.
Figure 13:
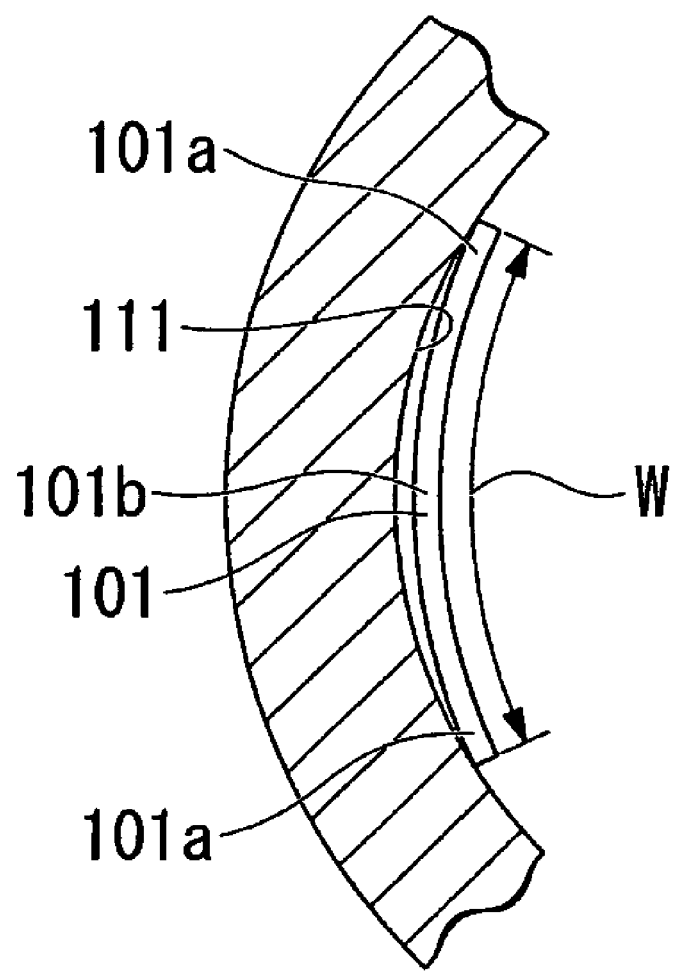
FIG. 13 is a cross-sectional view taken along a line E-E shown in FIG. 12.

As shown in FIG. 11, two slits 51 may be formed on the connecting portion of the engaging projection 36 connected with the outer peripheral portion of the shield body 35 toward the center portion 36a in the circumferential direction from both end portions 36b in the circumferential direction along the outer peripheral portion, and the engaging projection 36 may be deformable by bending using a connecting beam portion 36c sandwiched between two slits 51 as a start point.

In this case, since the engaging projection 36 can be deformed by bending using the connecting beam portion 36c as the start point, the engaging projection 36 can be easily bent so that it is possible to push the shield plate 33 into the engaging groove portion 40 with a smaller force whereby the shield plate 33 can be more easily mounted.

Further, it is also possible to swing both end portions 36b of the engaging projection 36 in the circumferential direction by making use of the gap defined by the slits 51, when the shield plate 33 is pushed into the engaging groove portion 40, a force in the circumferential direction transmitted to the engaging projection 36 can be easily absorbed. Accordingly, the whole engaging projection 36 can be fitted on the inner wall portion 42 of the engaging groove portion 40 easily.

FIG. 11 shows the example where the portions of the engaging projection 36 ranging from the center portion 36a in the circumferential direction from both end portions 36b in the circumferential direction are smoothly and arcuately curved.

What is claimed is:

1. A rolling bearing of an information recording and reproducing device, comprising:
    an inner ring and an outer ring which are arranged concentrically;
    a plurality of rolling bodies held between the inner ring and the outer ring in a rotatable manner; and
    an annular shield plate engageable with an engaging groove portion which is formed on an inner peripheral surface of the outer ring along the circumferential direction and opens toward an inner peripheral surface side and an open end side and closes a circular annular space defined between the outer ring and the inner ring; wherein
    the shield plate comprises:
    an annular shield body having an inner peripheral portion that surrounds the inner ring from the outside in the radial direction and an outer peripheral portion that faces the outer ring; and
    a plurality of engaging projections which are arranged along the outer peripheral portion of the shield body, project outwardly in the radial direction from the outer peripheral portion in an inclined state, and are engageable with the engaging groove portion, and
    wherein each of the engaging projections is deformable by bending in the orthogonal direction orthogonal to the in-plane direction of the shield body using a connecting portion of each of the engaging projections connected with the outer peripheral portion of the shield body as a start point, and is formed such that a projecting length of each of the engaging projections from the outer peripheral portion at both end portions in the circumferential direction is set shorter than the projecting length of each of the engaging projections from the outer peripheral portion at a center portion in the circumferential direction.

2. The rolling bearing according to claim 1, wherein the projecting length of each of the engaging projections is gradually shortened toward both end portions in the circumferential direction from the center portion in the circumferential direction.

3. The rolling bearing according to claim 1, wherein a cutaway groove which extends toward a shield body side from the outer peripheral portion is formed on the center portion of each of the engaging projections in the circumferential direction.

4. The rolling bearing according to claim 3, wherein the cutaway groove extends beyond the outer peripheral portion of the shield body and extends toward the shield body side.

5. The rolling bearing according to claim 1, wherein two slits are formed on the connecting portion of each of the engaging projections connected with the outer peripheral portion of the shield body along the outer peripheral portion toward the center portion in the circumferential direction from both end portions in the circumferential direction, and each of the engaging projections is deformable by bending in the orthogonal direction using a connecting beam portion sandwiched between two slits as a start point.

6. The rolling bearing according to claim 1, wherein the engaging groove portion is formed annularly over the whole inner peripheral surface of the outer ring.

7. The rolling bearing according to claim 1, wherein the engaging projections are arranged on the outer peripheral portion of the shield body equidistantly along the circumferential direction, and the number of engaging projections is a prime number of 3 or more.

8. The rolling bearing according to claim 1, wherein the number of engaging projections and the number of rolling bodies are in the relation of prime numbers to each other.

9. A bearing device comprising:
    the rolling bearing described in claim 1;
    a shaft which is formed into a columnar shape and to which the inner ring of the rolling bearing is fixed; and
    a cylindrical sleeve which is arranged concentrically with the shaft and to which the outer ring of the rolling bearing is fixed.

10. An information recording and reproducing device comprising:
    the bearing device described in claim 9;
    a carriage which is fitted on the sleeve, is rotatable around the shaft together with the sleeve, and includes an arm portion which supports a head gimbal assembly;
    a rotation drive part which rotates a magnetic recording medium in the predetermined direction; and
    an actuator which moves the head gimbal assembly in a direction parallel to a surface of the magnetic recording medium by rotating the carriage.

* * * * *